Feb. 18, 1936. G. C. SMITH 2,031,389

PACKED, FLEXIBLE, CONDUIT JOINT

Filed May 31, 1935

Inventor,
G. C. Smith;
By
H. E. Maynard,
Atty

Patented Feb. 18, 1936

2,031,389

UNITED STATES PATENT OFFICE 2,031,389

PACKED, FLEXIBLE, CONDUIT JOINT

Grover C. Smith, Los Angeles, Calif.

Application May 31, 1935, Serial No. 24,303

1 Claim. (Cl. 285—9)

This invention is a packed, flexible conduit joint especially for the assembly of high pressure conduit apparatus, constructed of metal sections.

It is an object of the invention to provide a simple, practical, substantial and highly efficient metallic section, hose joint. A further object is to provide a joint for the sections in which a resilient and expansile packing medium is utilized not only to effect the necessary seal to prevent leak at the joint of the relatively rotative sections but which is also employed to eliminate requirement of another and special part in the nature of a spring acting to press structural parts to respective seats.

The invention consists in certain advancements in this art as set forth in the ensuing disclosure and having, with the above, additional objects and advantages as hereinafter developed, and whose construction, combinations and details of means, and the manner and method of operation will be made manifest in the description of the herewith illustrative embodiment; it being understood that modifications, variations and adaptations may be resorted to within the scope, spirit and principle of the invention as it is more directly claimed hereinbelow.

Figure 1:
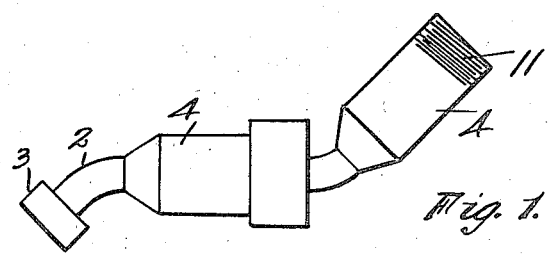
Figure 1 is a side elevation of a length of the conduit or metallic hose.
Figure 2:
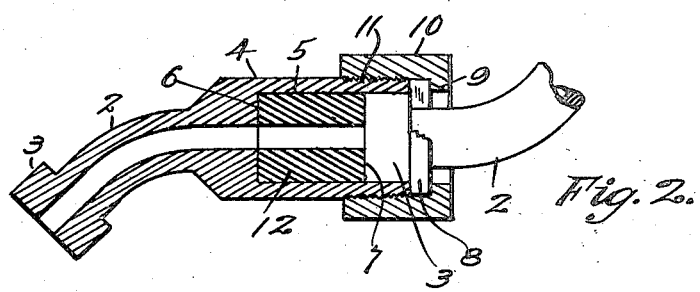
Figure 2 is an axial section of a joint.

The invention is incorporated in a metallic hose including a number of duplicate sections each with an elbow 2 having a terminal head 3 and enlarged cylindrical cup 4 on the opposite end; the head of one section being designed to telescope into the cup of the next section, to form therein a large bore chamber 5.

At the inner end of the chamber 5 is a plane, transverse shoulder or seat 6 axially opposite to which is the plane end face 7, of the intruded head 3, which also forms a seat.

The head is interlocked in its cup by an outer horse-shoe washer 8 astraddle the neck or elbow 2 and outwardly engaged by the internal flange 9 of a thimble 10 which screws onto threads 11 of the outer end of the cup 4.

Such a joint provides for the ready rotation of the head in the cup and great flexibility of a string or train of the sections of the hose.

A feature of the device is the peculiar means devised to effectively seal the string of sections to hold a very high degree of fluid pressure such as is common in the practice of high pressure, machine lubrication, and having the further function of reacting on contiguous elements as an expansion spring to force them to snug abutment; that is, to force the head 3 against the washer 8 and this to the wall surface of the nearby flange 9 of the thimble. Further, this means is characterized as being of an acid and oil resistive nature; preferably consisting of synthetic rubber.

This packing is in the form of a thick-walled tube 12 snugly fitting the bore of the cup and being compressed between the seats 6 and 7 when the clamping thimble 10 is screwed up with sufficient pressure to snugly hold the assembled parts against looseness, and to prevent leak of fluid at low pressures.

Figure 3:
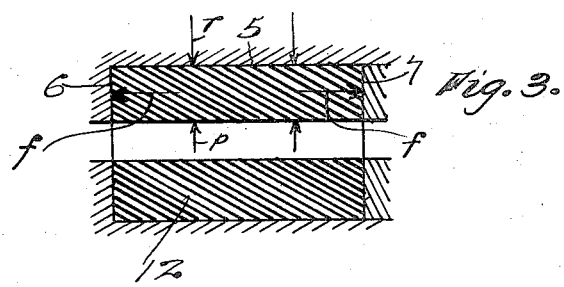
Figure 3 is a diagrammatic view of the lines of force on the packing element of the joint and its reaction in the joint.

As the pressure of fluid in the elastic tube 11 is increased it acts in the bore of the tube expansively, that is, radially and thrusts the substance of the tube outwardly with increasing pressure against the bore surface of the cup. Since this is an immovable body and since the synthetic rubber tube 11 is incompressible to any material degree, the packing therefore tends to flow, under this radial pressure, toward the end seats 6—7 and so builds up an end thrust pressure against the seats which is proportional to the pressure created in the passage of the tube 11. In practice this joint has withstood thousands of pounds pressure per square inch without leak. The action and reaction due to fluid pressure in the tube is indicated in the diagram of Fig. 3, by the several arrows p—r—f, indicating pressure, resistance and flow, on, of and by the resilient packing tube 11.

What is claimed is:

A packed, flexible conduit joint having, in combination, duplicate elbow sections each having a cup end and a bowed neck of less diameter than the cup, the neck terminating in a cylindrical head larger in diameter than the neck, and the cup having a cylindrical bore slidably and turnably receiving the complementary head of the next section, an elongated, tubular, packing gasket in, and seating against an end shoulder of, said bore, and means to detachably secure said head within said bore and against said gasket and including a horse-shoe washer lying against the outer face of the inserted head and a thimble having a bore to pass over the head of the neck in assembling the joint and screwing onto the cup and passing over and engaging the interposed washer; the latter having an external diameter greater than said head and less than that of the cup, and the total length of the compressed gasket and said head being about equal to the length of said bore.

GROVER C. SMITH.